(12) United States Patent
Kurokawa et al.

(10) Patent No.: US 7,637,554 B2
(45) Date of Patent: Dec. 29, 2009

(54) FLUSH MOUNTED PLASTIC WINDOW

(75) Inventors: Sachiko Kurokawa, Novi, MI (US);
Derek English, Detroit, MI (US); Alex Scholten, Langenfeld (DE)

(73) Assignee: Exatec LLC, Wixom, MI (US)

( * ) Notice: Subject to any disclaimer, the term of this patent is extended or adjusted under 35 U.S.C. 154(b) by 0 days.

(21) Appl. No.: 11/876,082

(22) Filed: Oct. 22, 2007

(65) Prior Publication Data

US 2008/0093884 A1   Apr. 24, 2008

Related U.S. Application Data

(60) Provisional application No. 60/862,281, filed on Oct. 20, 2006.

(51) Int. Cl.
*B60J 1/10*   (2006.01)

(52) U.S. Cl. .................. 296/146.15; 296/201

(58) Field of Classification Search ............ 296/146.15, 296/146.5, 201; 49/504, 501, 490.1; 52/208
See application file for complete search history.

(56) References Cited

U.S. PATENT DOCUMENTS

| | | | | |
|---|---|---|---|---|
| 2,388,297 | A * | 11/1945 | Slaughter | 428/53 |
| 3,029,481 | A * | 4/1962 | Henniges | 49/482.1 |
| 3,566,570 | A * | 3/1971 | Evans | 52/775 |
| 4,139,234 | A * | 2/1979 | Morgan | 296/201 |
| 4,248,933 | A * | 2/1981 | Katoh | 428/339 |
| 4,364,209 | A * | 12/1982 | Gebhard | 52/208 |
| 4,364,533 | A * | 12/1982 | Pompei et al. | 244/129.3 |
| 4,364,595 | A * | 12/1982 | Morgan et al. | 296/146.15 |
| 4,611,850 | A * | 9/1986 | Fujikawa | 296/146.15 |
| 4,700,525 | A * | 10/1987 | Nieboer et al. | 52/208 |
| 4,703,973 | A * | 11/1987 | Fujikawa | 296/201 |
| 4,712,341 | A * | 12/1987 | Harris et al. | 296/201 |
| 4,723,809 | A * | 2/1988 | Kida et al. | 296/201 |
| 4,951,907 | A * | 8/1990 | Gold | 296/146.15 |
| 4,993,204 | A * | 2/1991 | Kuritsky et al. | 52/309.15 |
| 5,042,871 | A * | 8/1991 | Gotanda et al. | 296/201 |

(Continued)

FOREIGN PATENT DOCUMENTS

DE    36 27 536 A1    2/1988

(Continued)

OTHER PUBLICATIONS

International Search Report—PCT/US2007/082086 (Mar. 4, 2008).

*Primary Examiner*—Kiran B. Patel
(74) *Attorney, Agent, or Firm*—Brinks Hofer Gilson & Lione

(57) ABSTRACT

A plastic window for use in a motor vehicle includes a plastic panel having portions defining an edge about a perimeter of the panel and a window flange integral to the plastic panel. The window flange is positioned adjacent to the edge and extends at least partially them along. The window flange includes an engagement feature configured to engage a corresponding engagement feature of a window frame. A window assembly Includes the plastic window and a window frame configured to be attached to a motor vehicle. The window frame has portions forming the corresponding engagement feature which receive the engagement feature of the window flange to secure the plastic window to the window frame. A method of installing a window on a motor vehicle is also disclosed.

6 Claims, 5 Drawing Sheets

U.S. PATENT DOCUMENTS

| | | | | |
|---|---|---|---|---|
| 5,081,793 A * | 1/1992 | Mauro | ............................ | 49/501 |
| 5,096,255 A * | 3/1992 | Leischner | .................... | 296/201 |
| 5,205,095 A * | 4/1993 | Kessler | ........................ | 296/201 |
| 5,363,596 A * | 11/1994 | Kronbetter | ................. | 49/495.1 |
| 5,570,548 A * | 11/1996 | Hopper | ....................... | 52/204.5 |
| 5,735,089 A * | 4/1998 | Smith et al. | .................... | 52/208 |
| 5,768,837 A * | 6/1998 | Sjoholm | ................... | 52/204.62 |
| 5,822,932 A * | 10/1998 | Agrawal | ....................... | 52/208 |
| 5,915,780 A * | 6/1999 | Kobrehel et al. | ........ | 296/146.15 |
| 5,941,022 A * | 8/1999 | Schmuck | ..................... | 49/141 |
| 5,975,615 A * | 11/1999 | Showalter | ................ | 296/96.21 |
| 5,987,826 A * | 11/1999 | Petta | ............................ | 52/208 |
| 6,209,946 B1 * | 4/2001 | Eng | ........................ | 296/146.15 |
| 6,408,574 B1 * | 6/2002 | Farrar et al. | .................... | 49/375 |
| 6,557,480 B1 * | 5/2003 | Nuss | ............................ | 114/173 |
| 6,745,523 B2 * | 6/2004 | Petta | ............................ | 52/213 |
| 6,797,384 B2 | 9/2004 | Gasworth | | |
| 6,871,902 B2 * | 3/2005 | Carson et al. | ........... | 296/146.15 |
| 6,973,754 B2 * | 12/2005 | Iguchi et al. | .............. | 296/146.1 |
| 7,386,959 B2 * | 6/2008 | Ouellette | ................. | 52/204.53 |
| 2007/0202933 A1 * | 8/2007 | Tolbert et al. | ............. | 455/575.1 |

FOREIGN PATENT DOCUMENTS

| | | |
|---|---|---|
| DE | 38 40 287 A1 | 5/1990 |
| DE | 198 20 386 A1 | 11/1998 |
| DE | 199 21 481 A1 | 11/2000 |
| EP | 0 304 694 A | 3/1989 |
| GB | 2 147 244 A | 5/1985 |

* cited by examiner

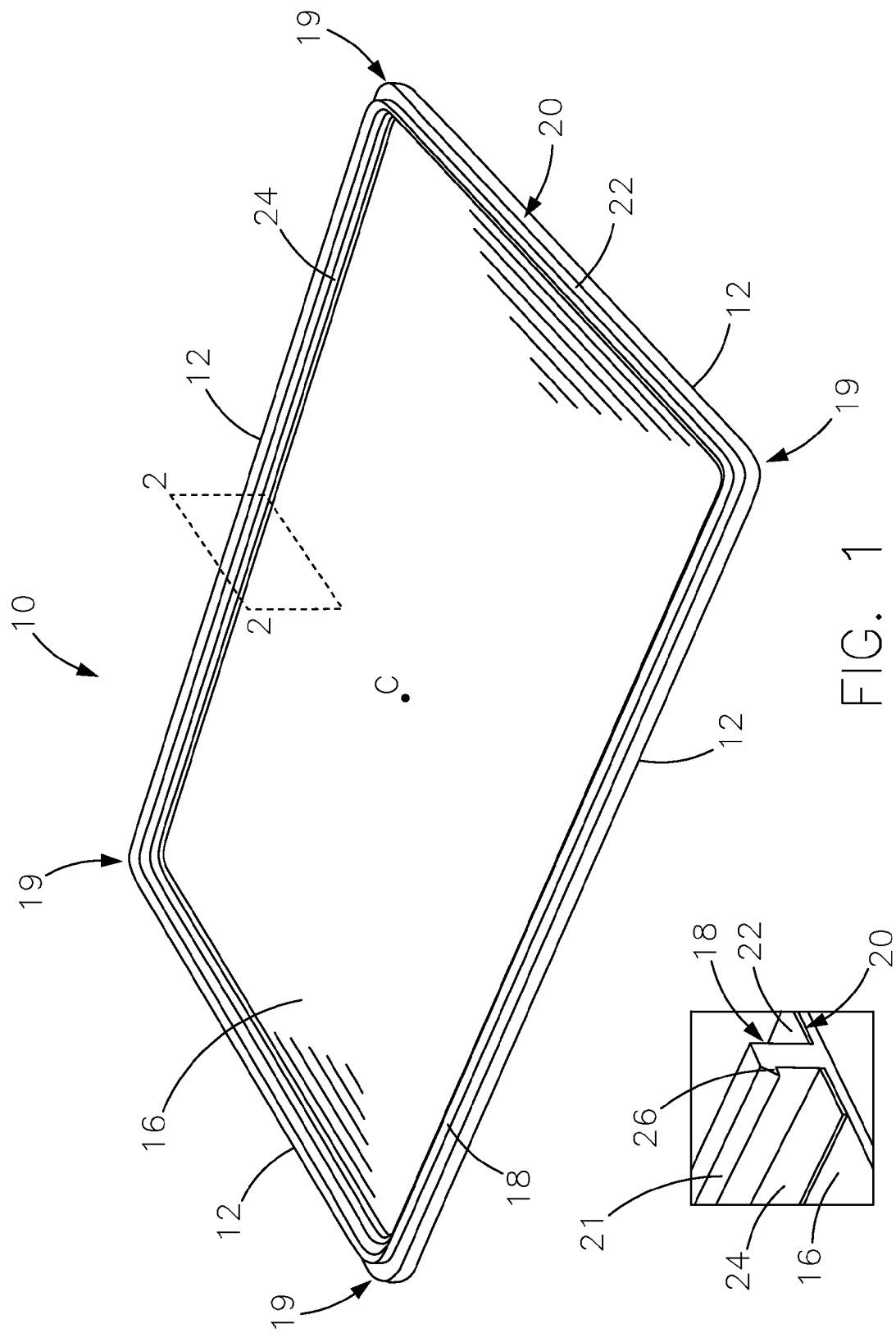

FLUSH MOUNTED PLASTIC WINDOW

CROSS-REFERENCE TO RELATED APPLICATIONS

This application claims the benefit of U.S. Provisional Application Ser. No. 60/862,281 filed on Oct. 20, 2006, entitled "POLYCARBONATE GLAZING FOR MODULAR DOORS," the entire contents of which are incorporated herein by reference.

BACKGROUND OF THE INVENTION

1. Field of the Invention

The present invention generally relates to windows for motor vehicles, and more particularly, to plastic windows for motor vehicles.

2. Description of the Related Technology

Over the past several decades, automobile manufacturers have sought to improve automobiles in every way. From improving safety, to enhancing functionality, to lowering costs, they have made great strides. One area of great concern, especially recently, is the rising cost of gasoline. In the past few years alone, gasoline has reached record high prices in the United States. One way the industry is trying to combat the problem is by developing alternative fuel technologies. However, developing alternative fuel technologies involves barriers to entry, such as lack of infrastructure and available fuel sources. Another way the industry is addressing the problem of high gas prices is by attempting to introduce gasoline powered automobiles that are more fuel efficient. This has been accomplished to some extent by introducing more efficient drive trains, but there are limitations to this approach due to vehicle weight. Thus, attempts have been made to reduce vehicle weight. In the past, however it was generally believed that reducing the weight of a vehicle exterior compromised the safety of the vehicle.

Windows in automobiles have typically been constructed of glass. Automotive glass has many limitations due to inherencies with the material. More specifically, automotive glass is constrained by the need to include complex attachment and regulating systems that add considerable weight to a door module, which is in addition to the weight of the glass itself. This additional weight impacts the performance of a car or truck by increasing fuel consumption and/or raising the center of gravity of the vehicle. Therefore, a need exists in providing a weight reduction in automotive glass and door modules.

Glass and other window systems may further be undesirable due to their complexity in assembling the window systems. For example, glass systems commonly utilize primer and bonding materials to attach the glass to the window frame. Glass may also be undesirable because of its propensity to shatter, and because it may need to be shattered in an emergency situation to create an escape route.

SUMMARY

The present invention provides a window for a motor vehicle, a window assembly for a motor vehicle, and a method of installing a window on a motor vehicle, which add little complexity and extra weight to a motor vehicle. Further, the present invention improves the safety of a motor vehicle, rather than compromising the safety of the vehicle.

In one aspect, a plastic window for use in a motor vehicle comprises a plastic panel having an edge and a window flange. The window flange is positioned adjacent to the edge and is configured to engage a corresponding feature of a window frame.

In another aspect, a window assembly for use in a motor vehicle comprises a plastic window and a window frame. The plastic window has an edge and a window flange positioned adjacent to the edge, the window flange having a lip. The window frame is configured to be attached to a motor vehicle. The window frame has portions forming a corresponding engagement feature, wherein the engagement feature of the window flange is matingly received within the corresponding engagement feature to secure the plastic window to the window frame.

In yet another aspect, a method of installing a window on a motor vehicle is provided. The method includes the steps of providing a plastic window having an edge and a window flange positioned adjacent to the edge and providing a window frame having portions forming a locking groove extending from an exterior surface of the motor vehicle. The method also includes a step of applying a force to the plastic window to snap the window flange into the locking groove to secure the plastic window to the window frame.

These and other aspects and advantages of the present invention will become apparent upon reading the following detailed description of the invention in combination with the accompanying drawings.

BRIEF DESCRIPTION OF THE DRAWINGS

FIG. 1 is a perspective view of a plastic window embodying the principles of the present invention;

FIG. 2 is a close-up perspective view of a window flange of the plastic window of FIG. 1, embodying the principles of the present invention;

DETAILED DESCRIPTION

Figure 3:
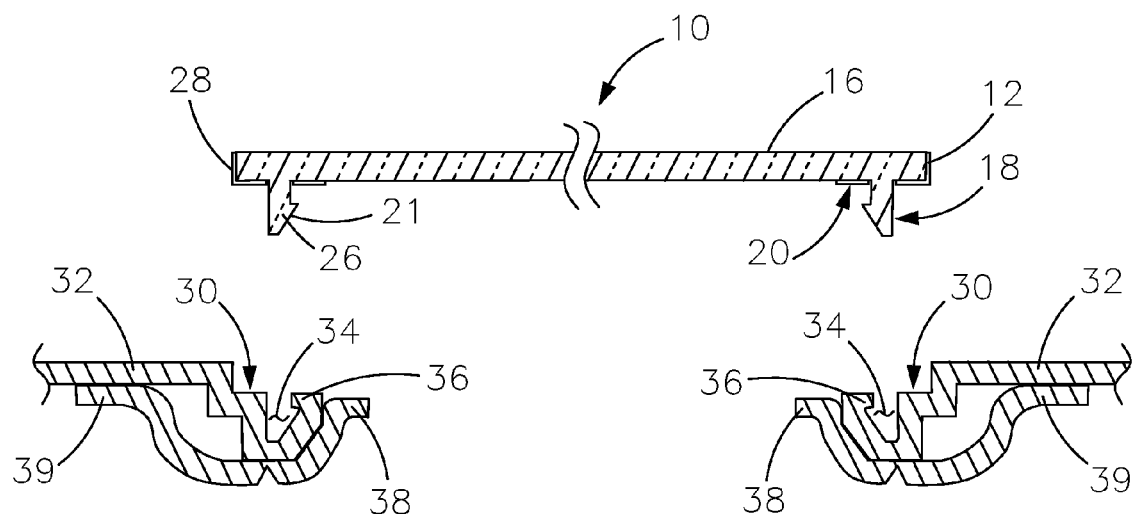
FIG. 3 is a cross-sectional view of the plastic window of FIG. 1 and a window frame embodying the principles of the present invention.

Referring now to FIGS. 1 and 2, a plastic window for use in a motor vehicle is illustrated and designated generally at 10. The plastic window 10 is shown embodying a generally rectangular shape having four edges 12, however, it should be understood that the plastic window 10 could have any other desired shape, without falling beyond the spirit and scope of the present invention. By way of example, the plastic window 10 could be of a triangular shape having three edges 12, or of an ovular shape having one continuous edge 12.

The plastic window 10 has a plastic panel 16 and a window flange 18 positioned adjacent to the edges 12 of the plastic window 10. The plastic panel 16 and the window flange 18 are preferably a unitary structure molded as one piece, in either a one-shot or two-shot process. However, they could alternatively be formed separately and attached together, for example, with glue, adhesives, or heat setting. The window flange 18 is shown as being continuous around each edge 12 of the plastic window 10, however, it should be understood that the window flange 18 could alternatively be comprised of a series of discrete, separate flanges. In some designs, it may be desirable to avoid having the window flange 18 extend around the corners 19 of the plastic window 10.

Preferably, the plastic panel 16 and window flange 18 are made of polycarbonate, which has a high impact strength and excellent transparency. Alternative suitable materials may include, by way of example, polymethylmethacrylate (PMMA), acrylic, polyacrylate, polyester, polysulfone, or copolymers, and combinations thereof. It is also contemplated that the plastic panel 16 and/or the window flange 18 could be formed of other thermoplastic resins, or any other suitable material. The plastic panel 16 and the window flange 18 may include bisphenol-A polycarbonate and other polycarbonate resin grades (such as branched or substituted) as well as being copolymerized or blended with other polymers, thereby, forming a blend with Acrylonitrile Butadiene Styrene (PC/ABS blend), or a polyester (PC/POLYESTER blend). In the alternative, the window flange 18 could be formed of any other material that may be attached to the plastic panel 16, such as metal. The plastic panel 16 is most preferably transparent, or less preferably translucent, however, the window flange 18 may be opaque, translucent, or transparent as a particular application warrants. The plastic panel 16 and window flange 18 may further comprise various additives, such as colorants, mold release agents, antioxidants, and ultraviolet absorbers.

The plastic window 10 may also have protective or functional layers located on the plastic panel 16. The protective or functional layers may include one or more of a weathering layer, a conductive layer, a decorative layer, and an abrasion resistant layer. These layers may be included on either or both sides of the plastic panel 16, and more than one of the same type of layer could be included on the same side of the plastic panel 16. For example, there could be multiple weathering layers for enhanced protection.

The weathering layer may provide weatherability to the plastic window 10, including protection from the sun's rays and other elements. By way of example, the weathering layer may be a film comprising polycarbonate, PMMA, a combination of polycarbonate and PMMA, polysiloxane, polyurethane, polyurethane acrylate, or any other suitable material. Further, the weathering layer may include a coating of a material such as acrylic, polyurethane, siloxane, or a combination of these types of materials to provide a high weatherability, including long term ultraviolet (UV) protection. Further, silicone nano-particles may be blended into the weathering layer or a siloxane co-polymer may be formed into the material making up the weathering layer by polymerization, which may help promote adhesion between the weathering layer and adjacent layers. The weathering layer may also include UV absorbing molecules, such as by way of example, one or more of or a combination of inorganic oxides, benzophenones, benzoylresorcinols, cyanoacrylates, triazines, oxanilides, and benzotriazoles. Preferably, the weathering layer has a thickness between 10 and 1250 micrometers. The weathering layer may be as described in U.S. Pat. No. 6,797,384, which is hereby incorporated by reference in its entirety.

The conductive layer could be provided as a resistive layer or grid, to serve as a heater, defroster, defogger, or an antenna, by way of example. The conductive layer could comprise, for example, a printed resistive ink or a transparent conductive layer applied to the plastic panel 10 or one of the other layers.

The decorative layer could add any desired decoration to the plastic window 10. For example, the decorative layer could form an image or define a blackened border to hide molding defects or a decorative printed ink.

The abrasion resistant layer may include a single layer or multiple sub-layers. The abrasion resistant layer may be comprised of aluminum oxide, barium fluoride, boron nitride, hafnium oxide, lanthanum fluoride, magnesium fluoride, magnesium oxide, scandium oxide, silicon monoxide, silicon dioxide, silicon nitride, silicon oxy-nitride, silicon oxy-carbide, hydrogenated silicon oxy-carbide, silicon carbide, tantalum oxide, titanium oxide, tin oxide, indium tin oxide, yttrium oxide, zinc oxide, zinc selenide, zinc sulfide, zirconium oxide, zirconium titanate, or a mixture or blend thereof. Preferably, the abrasion resistant layer is comprised of a composition of $SiO_x$ or $SiO_xC_yHz$ depending upon the amount of carbon and hydrogen atoms that remain in the deposited layer. In this regard, the abrasion resistant layer resembles a "glass-like" coating. The abrasion resistant layer may also comprise UV absorbing molecules, such as, but not limited to, inorganic oxides, benzophenones, benzoylresorcinols, cyanoacrylates, triazines, oxanilides, and benzotriazoles.

The various layers may be applied by any technique known to those skilled in the art. Such techniques include, by way of illustration and not limitation, coating techniques (sol-gel, spray, flow, dip and curtain), film insert molding techniques, printing techniques (screen printing, membrane image transfer, pad printing) and deposition techniques (plasma-enhanced chemical vapor deposition (PECVD), expanding thermal plasma PECVD, plasma polymerization, photochemical vapor deposition, ion beam deposition, ion plating deposition, cathodic arc deposition, sputtering, evaporation, hollow-cathode activated deposition, magnetron activated deposition, activated reactive evaporation and thermal chemical vapor deposition).

To provide the plastic window 10 with additional stiffness, the plastic window 10 may have a reinforcing frame 20 positioned about and along the edges 12 of the plastic window 10. Such a reinforcing frame 20 may include an outer portion 22 (located between the window flange 18 and the plurality of edges 12) and an inner portion 24 (located between a center C of the plastic panel 16 and the window flange 18). It should be understood that the reinforcing frame 20 is optional, and it could alternatively be provided having merely one of the outer and inner portions 22, 24. Such a reinforcing frame 20 is preferably formed of metal, although any other suitable material could be used. Further, the reinforcing frame 20 could be attached by any suitable method, for example, by using glue or adhesives.

Figure 4:
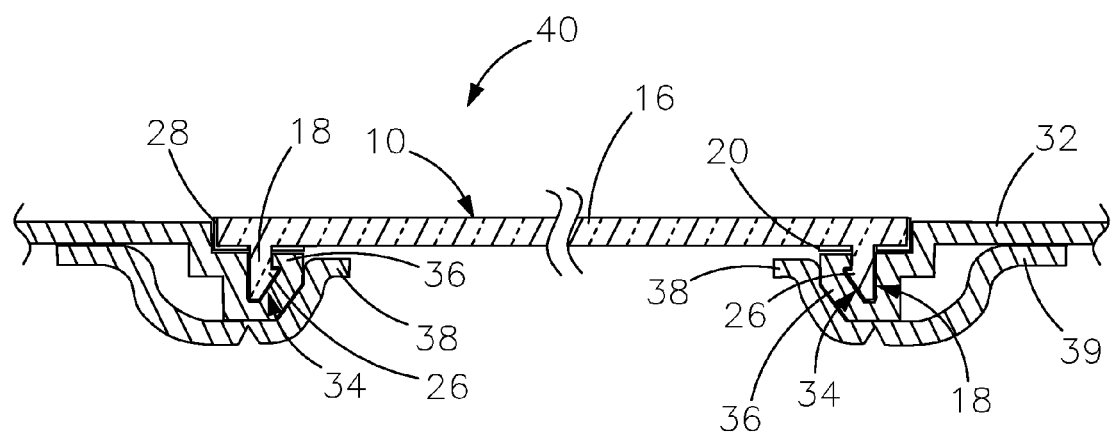
FIG. 4 is a cross-sectional view of the plastic window and window frame of FIG. 3 in an assembled form, thus illustrating a window assembly embodying the principles of the present invention.

Referring to FIGS. 3 and 4, the plastic window 10 is shown in an uninstalled positioned adjacent to a window frame 30 in FIG. 3 and in an installed position in FIG. 4. The window flange 18 extends outward from an interior surface of the panel 16, adjacent to the panel's edge 12 and generally defines a rim-like structure about the panel 16. The distal end of the flange 18 defines an engagement feature and is shaped so as to matingly engage a corresponding locking groove 34 formed as part of the window frame 30. For this purpose, the distal end is tapered with a ramp surface 21 that assists with the entry of the flange 18 into the groove 34. The ramp surface 21 terminates in a catch or lip 26 configured to engage a corresponding feature in the window frame 30. While described with particularity, it should be understood that the window flange 18 could have other configurations configured to engage the locking groove 34, without falling beyond the spirit and scope of the present invention.

The window frame 30 generally corresponds to the shape of the plastic window 10 and is fixed to and extends from an exterior surface 32, such as a sheet metal exterior, of a motor vehicle and has portions forming the locking groove 34. The locking groove 34 may be stamped or otherwise formed into the window frame 30. To retain the window 10, the window frame 30 includes a hem flange 36 defining a catch portion of the locking groove 34, which interacts with and engages the lip 26 of the flange 18. The hem flange 36 is shaped to matingly engage the lip 26 of the window flange 18 when inserted into the locking groove 34.

A release handle 38, or pull tab, is shown as being coupled to the hem flange 36. The release handle 38 may extend from an attachment portion 39 that is secured, for example by welding, to the underside of the vehicle exterior surface 32 or the window frame 30 itself. The release handle 38 may be welded or otherwise coupled to the hem flange 36 such that when a user applies a predetermined force to the release handle 38, the hem flange 36 is moved away from the lip 26 of the window flange 18. This procedure is described in further detail below.

Figure 5:
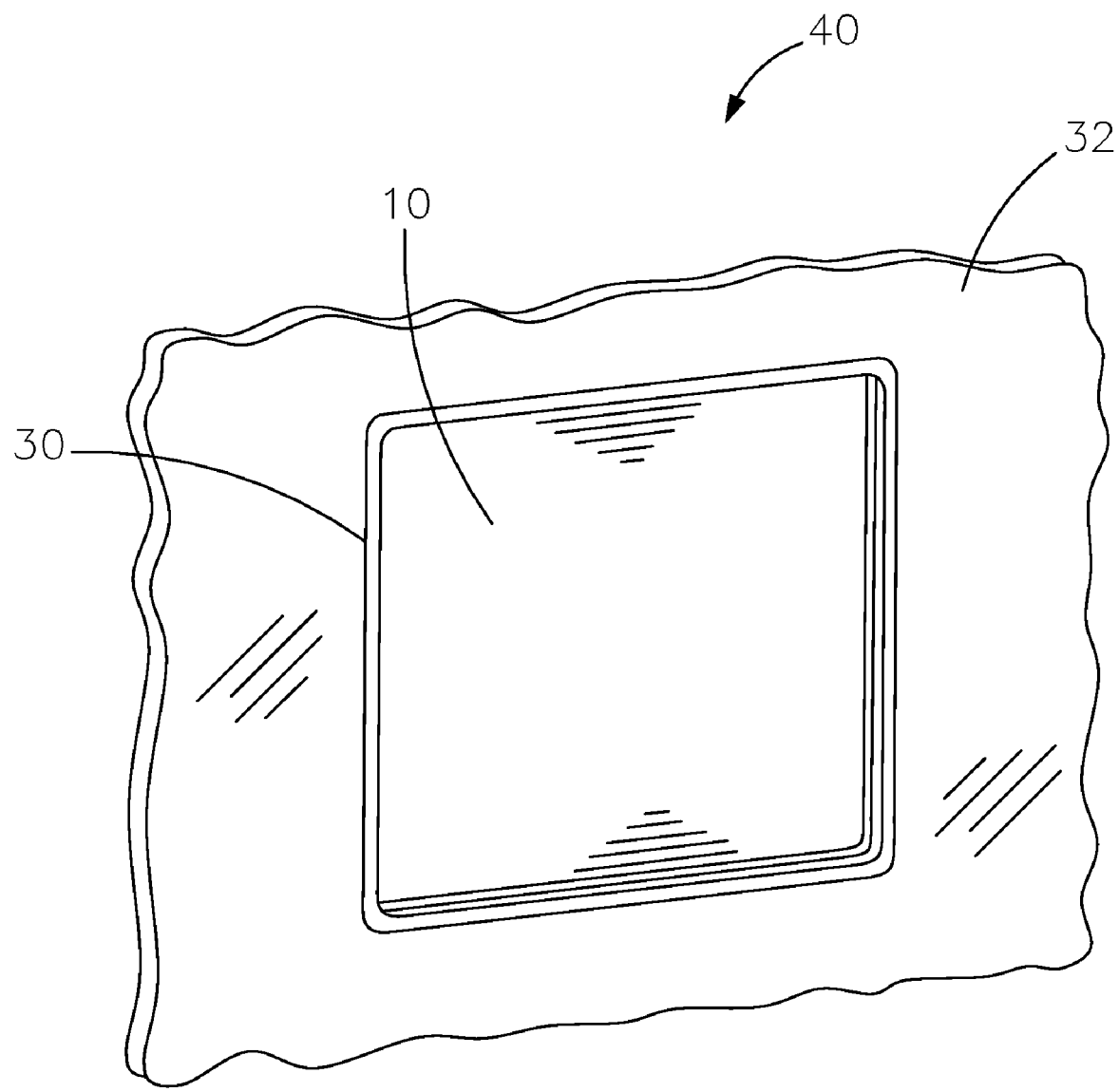
FIG. 5 is a perspective view of the window assembly of FIG. 4, embodying the principles of the present invention.

In the installed position, (see FIG. 5) the plastic window 10 is flush mounted with the exterior surface 32 of the vehicle. Thus, the locking groove 34 is provided at a predetermined distance from the exterior surface 32 of the vehicle, so that when the plastic window 10 is installed, it will be mounted approximately flush with the exterior surface 32 of the vehicle.

Rubber seals 28 extend around the edges 12, to seal the edges of the plastic window 10 when it is installed onto a motor vehicle. The rubber seals 28 may help accommodate thermal expansion and may assist with noise reduction. Further, the rubber seals 28 may function as weather stripping to block out wind, rain, and other elements, for example.

Figure 6:
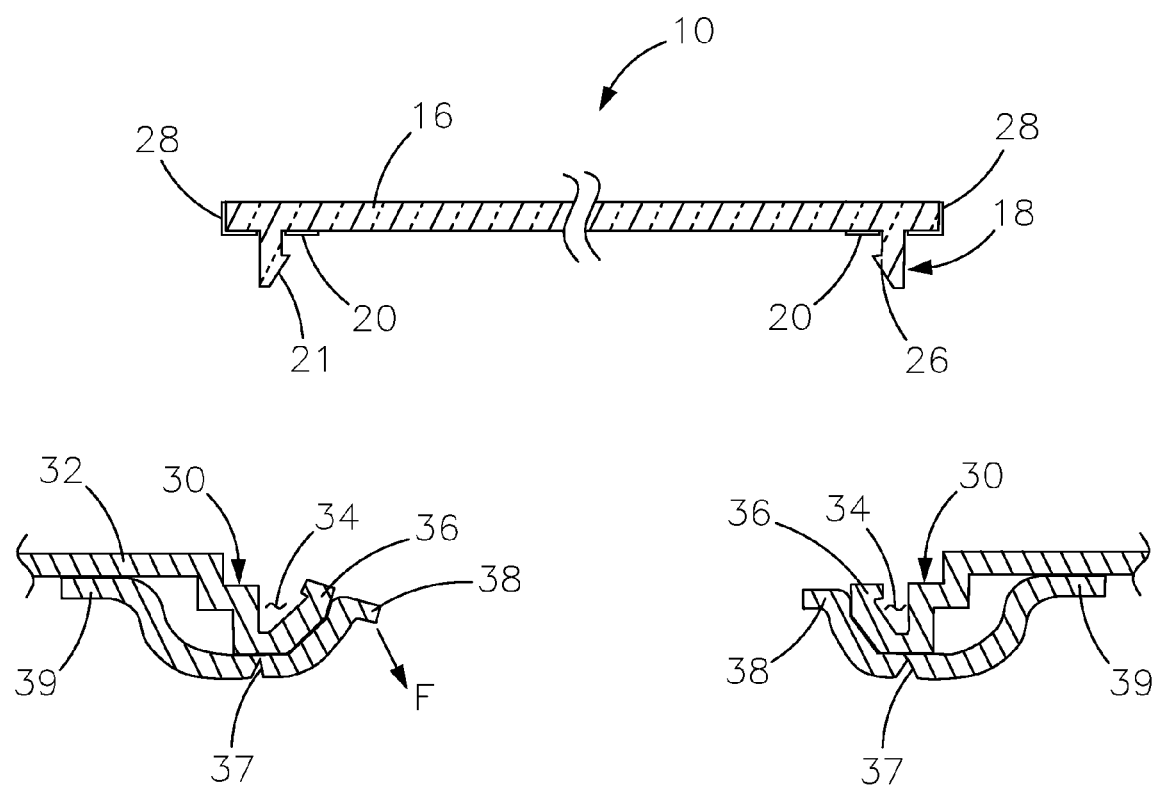
FIG. 6 is a cross-sectional view of the plastic window and window frame of FIGS. 3-5, embodying the principles of the present invention, illustrating a removal feature of the assembly.

With reference to FIG. 6, the plastic window 10 is shown immediately after removal from the window frame 30. When a user applies a predetermined force F to the release handle 38, the hem flange 36 is pulled away from at least a portion of the window flange 18 and a user can then push the plastic window 10 away from the window frame 30. To aid in this movement of the release handle 38 and hem flange 34, a weakening strip 37 may be formed into the release handle 38 as a notched or scored groove. Preferably, the weakening strip 37 is located next to the locking groove 34 so as to allow for movement of the hem flange 36. This releases the plastic window 10 from the window frame 30. As such, the release handle 38 can be used as an emergency escape mechanism. Further, the release handle 38 could also allow for release of the plastic window 10 for routine cleaning, maintenance, or replacement.

In addition to the release handle 38, or as an alternative, the hem flange 36 could be designed to withstand the application of outward forces up to a certain limit. Thus, the window assembly 40 could be designed to allow a user to apply a predetermined force to the plastic window 10, such as a kicking force from the interior of the vehicle, to push the plastic window 10 out of the window frame 30, if desired.

Figure 7:
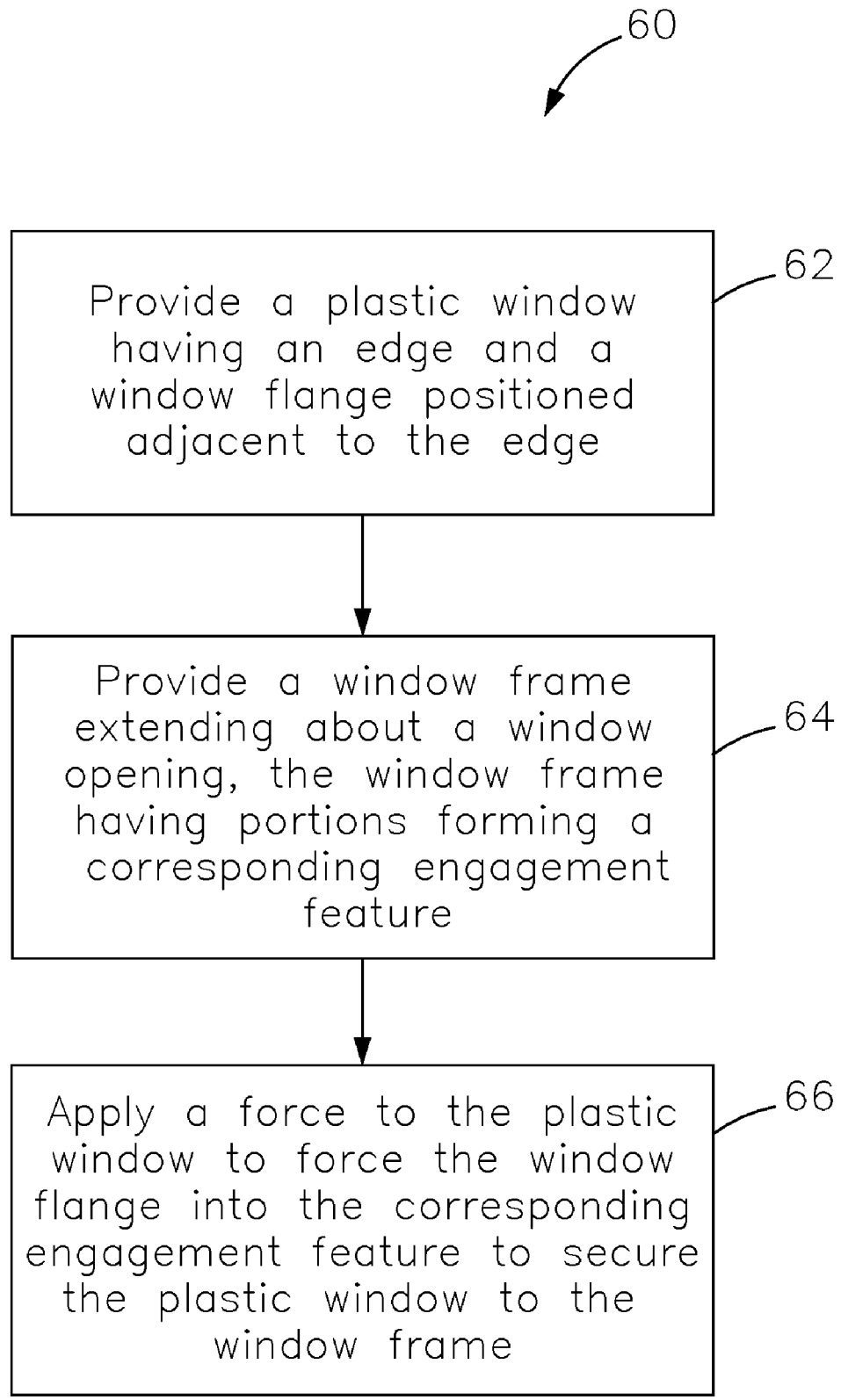
FIG. 7 is a block diagram illustrating a method embodying the principles of the present invention.

With reference to FIG. 7, as evident from the above discussion, the plastic window 10 may be installed using a method 60 that does not require glue or adhesives. The method 60 referring to FIG. 7 includes the step 62 of providing a plastic window 10 having an edge 12 and a window flange 18 positioned adjacent to the edge 12. The method 60 also includes providing a window frame 30 having portions forming a locking groove 34 extending from an exterior surface 32 of the motor vehicle (step 64), and (step 66) securing the plastic window 10 to the window frame 30 by applying a force to the plastic window 10 to snap the window flange 18 into the locking groove 34 of the frame 30.

The method 60 may optionally include providing the portions forming the locking groove 34 at a predetermined distance from the exterior surface 32 of the motor vehicle such that the plastic window 10 is flush mounted with the exterior surface 32 of the motor vehicle once the window flange 18 has been snapped into the locking groove 34. Another optional step of the method 60 may include releasing the plastic panel 16 from the window frame 30 by pulling on a release handle 38 being configured to pull the hem flange 36 away from the window flange 18, thereby releasing the window flange 18 from the locking groove 34.

Thus, the present invention provides a window assembly 40 wherein the plastic window 10 may be attached to the window frame 30 in a single step by pressing or snapping the window flange 18 of the plastic window 10 into the locking groove 34 of the window frame 30. This type of assembly may be described as a snap-fit, press-fit, or zip-locked window assembly 40. The plastic window 10 can achieve this mounting method because it is much easier to handle than glass, as well as weighing about 50% less than a glass window.

The window frame 30 has been illustrated and described as being fixed to the exterior surface 32 of the motor vehicle. Thus, the previously described embodiment of the invention provides a fixed window assembly 40. In an alternate embodiment, however, the window frame 30 could be a movable frame such that the plastic window 10 could be moved to open and close the plastic window 10, as is common in sun roofs and windows on the driver's and passenger's sides of a motor vehicle.

As a person skilled in the art will readily appreciate, the above description is meant only as illustrative implementation of the principles this invention. This description is not intended to limit the scope or application of this invention in that the invention is susceptible to modification, variation and change, without departing from the spirit of this invention.

The invention claimed is:

1. A window assembly for a motor vehicle, the window assembly comprising:
   a plastic window having a plastic panel with portions defining an edge about a perimeter of the panel, a window flange being of a one-piece construction with the plastic panel, the window flange being positioned adjacent to the edge and extending at least partially there along, the window flange including an engagement feature having a ramp surface and a lip; and
   a window frame configured to be attached to the motor vehicle, the window frame having inner and outer portions forming a corresponding engagement feature including a locking groove and a hem flange, the engagement feature of the window flange being matingly and releasably received within the corresponding engagement feature to secure the plastic window to the window frame, the corresponding engagement feature being moveable to release at least a portion of the plastic window.

2. The window assembly of claim 1, wherein the window flange is positioned adjacent to the edge and extends completely about the perimeter of the plastic panel.

3. The window assembly of claim 1, wherein the window frame includes an offset portion locating the plastic window flush mounted with the sheet metal exterior surface of the motor vehicle.

4. The window assembly of claim 1, wherein the hem flange interlocks with the lip to secure the plastic window to the window frame.

5. The window assembly of claim 1, further comprising a release handle coupled to the corresponding engagement feature of the window frame, the release handle being configured to pull the corresponding engagement feature away from the engagement feature of the window flange to release at least a portion of the plastic window when a user applies a predetermined force to the release handle.

6. The window assembly of claim 5, wherein the release handle includes a weakening portion disposed adjacent to the corresponding engagement feature to aid a user in pulling the release handle to move the corresponding engagement feature away from the engagement feature.

* * * * *